United States Patent
Jeong et al.

(10) Patent No.: US 10,971,982 B2
(45) Date of Patent: Apr. 6, 2021

(54) MOVING CORE TYPE RECIPROCATING MOTOR AND COMPRESSOR

(71) Applicant: LG ELECTRONICS INC., Seoul (KR)

(72) Inventors: Sangsub Jeong, Seoul (KR); Jaebeum Kim, Seoul (KR); Susok Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 320 days.

(21) Appl. No.: 15/878,564

(22) Filed: Jan. 24, 2018

(65) Prior Publication Data
US 2018/0212503 A1 Jul. 26, 2018

(30) Foreign Application Priority Data
Jan. 26, 2017 (KR) .......................... 10-2017-0012794

(51) Int. Cl.
| | |
|---|---|
| H02K 33/00 | (2006.01) |
| F04B 35/04 | (2006.01) |
| F04B 39/12 | (2006.01) |
| H02K 33/16 | (2006.01) |
| H02K 7/14 | (2006.01) |
| H02K 1/34 | (2006.01) |

(Continued)

(52) U.S. Cl.
CPC ............ *H02K 33/00* (2013.01); *F04B 35/04* (2013.01); *F04B 35/045* (2013.01); *F04B 39/121* (2013.01); *F04B 49/06* (2013.01); *H02K 33/16* (2013.01); *H02K 1/34* (2013.01); *H02K 7/14* (2013.01); *H02K 41/033* (2013.01)

(58) Field of Classification Search
CPC ...... H02K 35/00; H02K 35/02; H02K 41/033; F04B 35/04; F04B 35/045; F04B 17/03; F04B 17/04; F04B 17/042; F04B 17/044; F04B 17/046
USPC ..................................................... 310/15, 23
See application file for complete search history.

(56) References Cited

U.S. PATENT DOCUMENTS

| | | | |
|---|---|---|---|
| 6,184,597 B1 * | 2/2001 | Yamamoto | H02K 33/16 310/14 |
| 2005/0023905 A1 | 2/2005 | Sakamoto | |

(Continued)

FOREIGN PATENT DOCUMENTS

| | | |
|---|---|---|
| CN | 103095089 | 5/2013 |
| JP | H 05-184121 | 7/1993 |

(Continued)

OTHER PUBLICATIONS

International Search Report dated May 23, 2018 issued in Application No. PCT/KR2018/000765 (with English Translation).

(Continued)

*Primary Examiner* — Philip E Stimpert
(74) *Attorney, Agent, or Firm* — KED & Associates LLP

(57) ABSTRACT

A moving core type reciprocating motor is provided that may include a stator on which a coil may be wound and having an air gap; a magnet fixed to the stator; and a mover that includes a moving core disposed to face the magnet in the air gap and reciprocates with respect to the stator. The magnet may have a first pole and a second pole that are different poles arranged in a reciprocation direction of the mover, and a length of the first pole may be larger than a length of the second pole.

17 Claims, 13 Drawing Sheets

(51) Int. Cl.
*H02K 41/03* (2006.01)
*F04B 49/06* (2006.01)

(56) References Cited

U.S. PATENT DOCUMENTS

2005/0057101 A1* 3/2005 Nakagawa ........... H02K 41/033
                                                       310/12.24
2006/0222532 A1* 10/2006 Lee ....................... F04B 35/045
                                                       417/417

FOREIGN PATENT DOCUMENTS

| | | | | |
|---|---|---|---|---|
| JP | 2000-083364 | 3/2000 | | |
| JP | 2002-010610 | 1/2002 | | |
| JP | 2002-034225 | 1/2002 | | |
| JP | 2002-325415 | 11/2002 | | |
| JP | 2006-034057 | 2/2006 | | |
| KR | 10-0492612 | 5/2005 | | |
| KR | 10-0539813 | 12/2005 | | |
| WO | WO-2008002414 A2 * | 1/2008 | ............... | H01F 3/06 |
| WO | WO 2016/182211 | 11/2016 | | |

OTHER PUBLICATIONS

European Search Report dated Jun. 15, 2018 issued in Application No. 18153640.0.

* cited by examiner

MOVING CORE TYPE RECIPROCATING MOTOR AND COMPRESSOR

CROSS-REFERENCE TO RELATED APPLICATION(S)

The present application claims priority under 35 U.S.C. 119 and 35 U.S.C. 365 to Korean Patent Application No. 10-2017-0012794, filed in Korea on Jan. 26, 2017, which is hereby incorporated by reference in its entirety.

BACKGROUND

1. Field

A moving core type reciprocating motor and a compressor are disclosed herein.

2. Background

Motors, which are machines that obtain torque or reciprocating power by converting electrical energy into mechanical energy, can be classified into an AC motor and a DC motor, depending on power that is supplied thereto. A motor includes a stator and a mover (or a rotor), the mover having a magnet rotated or reciprocated, depending on a direction of flux generated when current flows through a coil wound on the stator.

Motors can be classified into a rotary motor or a reciprocating motor, depending on a motion type of the mover. As for a rotary motor, magnetic flux is generated through the stator by power applied to the coil and the mover is rotated relatively to the stator by the magnetic flux. On the contrary, in a reciprocating motor, the mover reciprocates straight with respect to the stator.

Recently, a reciprocating motor for a compressor in which a stator is formed in a cylindrical shape having an inner stator and an outer stator and a coil for generating induced magnetization is wound on any one of the inner stator or the outer stator has been proposed. According to the reciprocating motor for a compressor, the mover has a magnet with magnet poles arranged in an axial direction and the mover reciprocates in an air gap between the inner stator and the outer stator.

Such a reciprocating motor for a compressor has been disclosed in Korean Patent Nos. 10-0492612 (hereafter, referred to as 'related art 1') and 10-0539813 (by reference, hereafter, referred to as 'related art 2), which are hereby incorporated. In both of related arts 1 and 2, a cylindrical outer stator or inner stator are formed by radially stacking a plurality of iron cores formed in thin plate shapes on a ring-shaped coil.

Such reciprocating motors include mechanical resonant springs, which are compression coil springs, on both sides in a reciprocating direction of a mover so that the mover can stably reciprocate. Accordingly, when the mover is moved forward and backward in the magnetic flux direction of power supplied to the coil, the mechanical resonant springs disposed in the movement direction of the mover are compressed and accumulate repulsive force. Further, when the mover is moved in the opposite direction, the mechanical resonant springs keeping the repulsive force push the mover, and this process is repeated.

However, according to the reciprocating motors of the related art, there is a problem that the mover is supported by the compression coil springs, but due to the resonance that is generated by characteristics of the compression coil springs, a specific period in a predetermined range of frequency cannot be used as an operation frequency. Further, according to the reciprocating motors of the related art, as the compression coil springs support the mover, a mechanical stress limit and a restriction on amplitude are generated due to characteristics of the compression coil springs. Accordingly, as a predetermined wire diameter and length should be secured for the resonant springs, there is a limit in reducing a transverse length of the reciprocating motors. Furthermore, according to the reciprocating motors of the related art, there is another problem that the magnet frame supporting the magnet is thick, so a weight of the entire mover is increased and power consumption is correspondingly increased.

BRIEF DESCRIPTION OF THE DRAWINGS

Embodiments will be described in detail with reference to the following drawings in which like reference numerals refer to like elements, and wherein.

DETAILED DESCRIPTION

Figure 1:
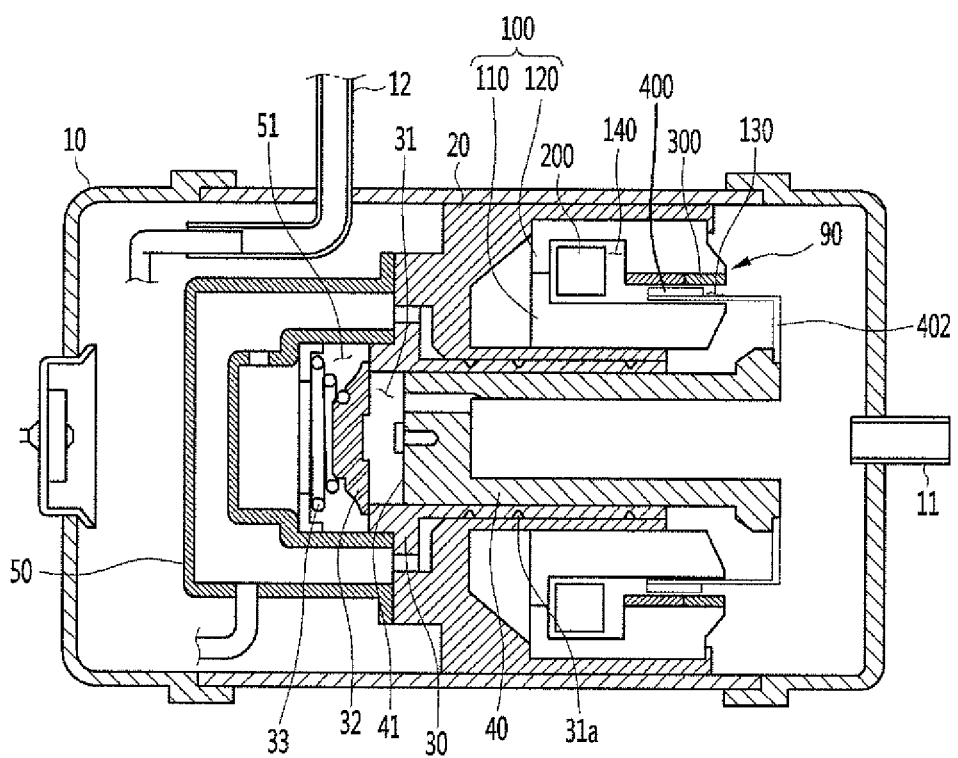
FIG. 1 is a vertical cross-sectional view of a compressor including a moving core type reciprocating motor according to an embodiment.
Figure 2:
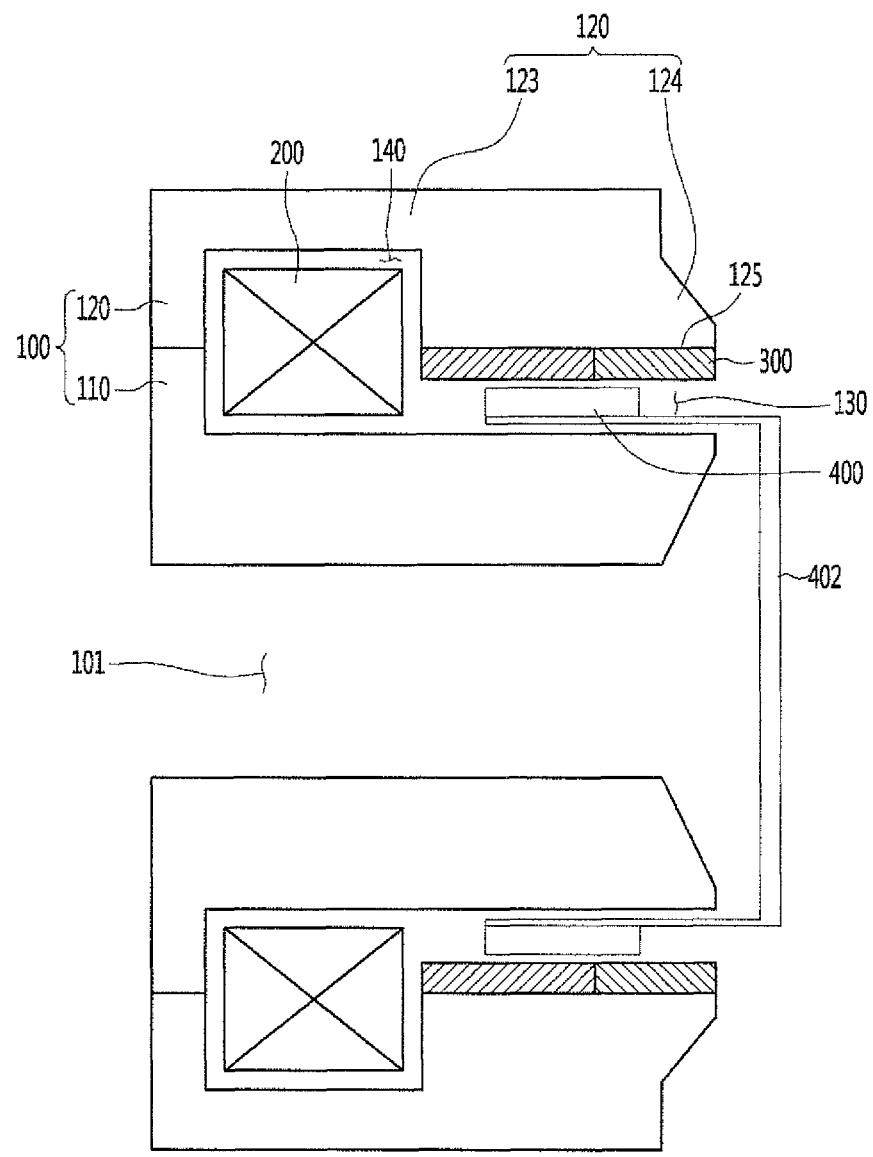
FIG. 2 is a cross-sectional view schematically showing the moving core type reciprocating motor according to an embodiment.
Figure 3:
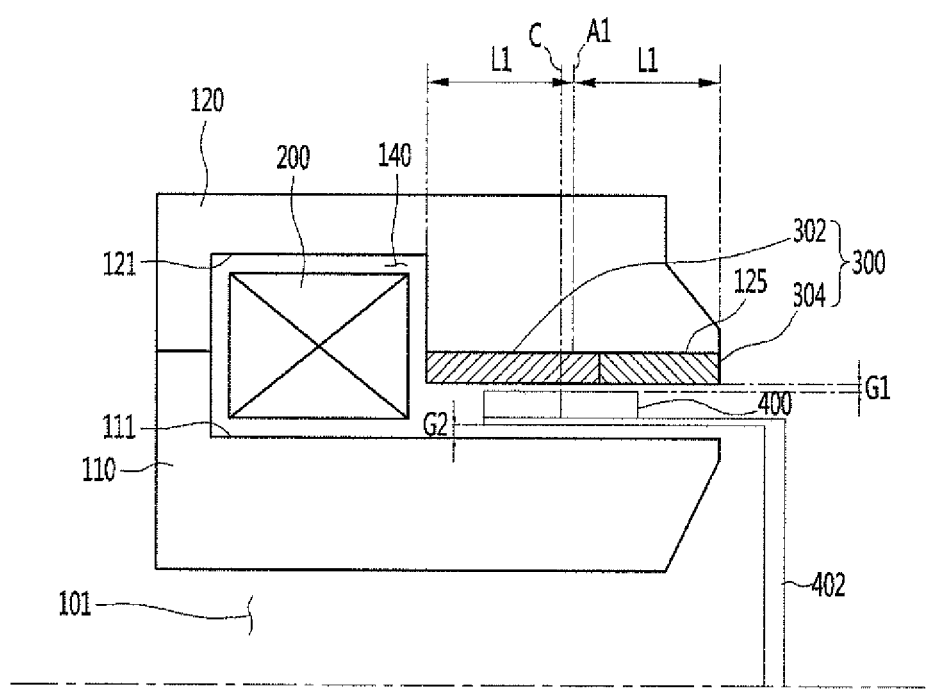
FIG. 3 is a cross-sectional view showing portions of a stator and a mover of FIG. 2.
Figure 4:
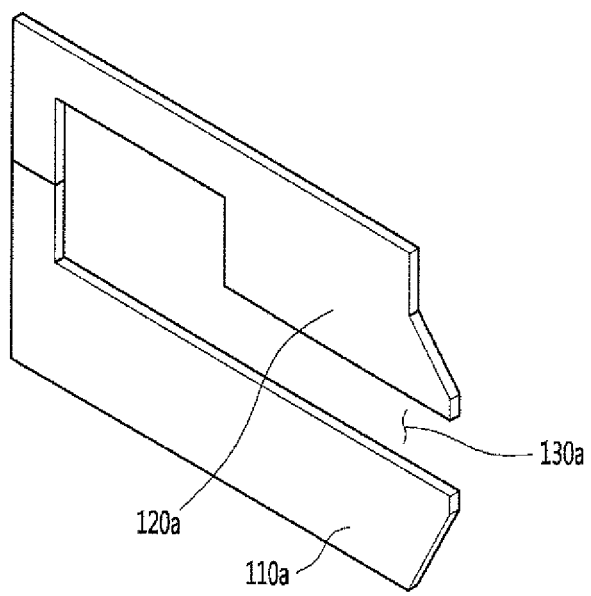
FIG. 4 is a perspective view showing a core block of the stator of FIG. 3.

FIG. 1 is a vertical cross-sectional view of a compressor including a moving core type reciprocating motor according to an embodiment. FIG. 2 is a cross-sectional view schematically showing the moving core type reciprocating motor according to an embodiment. FIG. 3 is a cross-sectional view showing portions of a stator and a mover of FIG. 2. FIG. 4 is a perspective view showing a core block constituting the stator of FIG. 3.

Referring to FIGS. 1 to 4, a compressor according to an embodiment may include a case 10 forming an external shape and having an internal space. The compressor may further include a reciprocating motor 90 disposed in the internal space of the case 10 and including a moving core 400 that reciprocates.

The compressor may include a piston 40 connected to a mover of the reciprocating motor 90 and reciprocating with the mover and a cylinder 30 in which the piston 40 is inserted, thereby forming a compression space 31. Further, the compressor may include an intake valve 41 that opens and closes an intake side of the compression space 31 and a discharge valve 32 that opens and closes a discharge side of the compression space 31.

An intake pipe 11 may be connected to the closed case 10 and a discharge pipe 12 that discharges a coolant compressed in the compression space 31 of the cylinder 30 is connected to the closed case 10 at a predetermined distance from the intake pipe 11. Accordingly, the internal space of the case 10 may be filled with a suctioned coolant, thereby generating an intake pressure, and the coolant discharged from the compression space 31 may be discharged out of the case 10 through the discharge pipe 12.

A frame 20 may be disposed in the internal space of the case 10 and the reciprocating motor 90 that generates a reciprocating force and induces a resonant motion of the piston 40 may be fixed to a side of the frame 20. The cylinder 30 may be coupled inside the reciprocating motor 90 and the piston 40 that compresses the coolant by changing a volume of the compression space 31 may be combined with the piston 30.

A discharge cover 50 may be coupled to the frame 20. The discharge valve 32 may be disposed inside the discharge cover 50 and may be supported by a valve spring 33. The discharge valve 32 may open and close the compression space 31 while being supported by the valve spring 33.

The discharge cover 50 may have a discharge space 51. A portion of the coolant discharged into the discharge space 51 may be supplied to the space between the cylinder 30 and the piston 40.

A gas channel (not shown) may be formed in the frame 20 and a plurality of gas holes 31a through which the coolant passing through the gas channel passes may be formed in the cylinder 30.

The reciprocating motor 90 may include a stator 100, a magnet 300 disposed on the stator 100, and a mover that moves with respect to the stator 100. The mover may include a bridge 402 connected to the piston 40 and the moving core 400 disposed on the bridge 402. Accordingly, when the moving core 400 reciprocates with respect to the stator 100 and the magnet 300, the piston 40 inserted in the cylinder 30 reciprocates with the moving core 400.

The reciprocating motor 90 is described hereafter.

The stator 100 may include an inner stator 110 and the outer stator 120. The outer stator 120 may have a first side connected to the inner stator 110 and a second side disposed radially outside the inner stator 110 to form an air gap 130 together with a second side of the inner stator 110. The inner stator 110 and the outer stator 120 may be made of a magnetic or conductive material, for example.

In this embodiment, the inner stator 110 may be formed by circumferentially stacking inner core blocks 110a. Alternatively, the outer stator 120 may be formed by circumferentially stacking outer core blocks 120a.

As shown in FIG. 4, the inner core block 110a and the outer core block 120a may be formed in thin plate shapes with first sides connected to each other and second sides spaced from each other to form an air gap 130a. As described above, when the inner core blocks 110a and the outer core block 120a are circumferentially stacked, the inner stator 110 and the outer stator 120 may have generally a cylindrical shape (or a ring shape) having a center hole 101 when seen in an axial direction. In this case, the air gap 130 formed between the inner stator 110 and the outer stator 120 may also be formed generally in a ring shape.

In this embodiment, at least one of the inner core block 110a or the outer core block 120a may be formed in an I-shape, L-shape, or U-shape and may have other various shapes. For example, an inner core block 110a and an outer core block 120a which may be connected to each other may have a U-shape.

On the other hand, the coil 200 may be wound between the inner stator 110 and the outer stator 120. For example, the outer stator 120 may be combined with the inner stator 110 with the coil 200 wound on the inner stator 110.

Alternatively, the outer stator 120 may be combined with the inner stator 110 with the coil 200, which has been wound in a ring shape in advance, covering the inner stator 110. The outer stator 120 may surround an outer side of the coil 200.

Alternatively, the stator 100 may be manufactured with the inner core blocks 110a and the outer core blocks 120a integrated to form a U-shape and then a portion of the stator 100 may be inserted in the coil 200 wound in advance in a ring shape.

Referring to FIG. 3 again, a space 140 connected with the air gap 130 and receiving the coil 200 may be formed between the inner stator 110 and the outer stator 120. Winding grooves 111 and 121 recessed inward to form the space 140 may be formed on at least one of the inner stator 110 or the outer stator 120.

Sizes of the space 140 or the winding grooves 111 and 121 may be proportioned to an amount of the wound coil 200. For example, the winding grooves 111 and 121 may be formed on both of the inner stator 110 and the outer stator 120.

When the winding grooves 111 and 121 are formed, as described above, the spacer 140 in which the coil 200 is received is provided, so the coil 200 and the inner and outer stators 110 and 120 may be more easily combined. Further, a yoke portion or yoke 123 which is thinner than a pole portion or pole 124 where the magnet 300 is fixed may be formed at at least one of the inner stator 110 or the outer stator 120 by the winding groove 121.

As described above, the yoke portion 123 which is a magnetic path and the pole portion 124 which is larger in width than the yoke portion 123 and where the magnet 300 is fixed may be formed at at least one of the inner stator 110 or the outer stator 120. The pole 124 may be the same as or larger in length than the magnet 300 fixed thereto.

A rigidity of a magnetic resonance spring, an alpha value (a thrust constant of a motor), and an alpha value change rate, for example, may be determined by the combination of the yoke portion 123 and the pole portion 124. A length or shape of the yoke portion 123 and the pole portion 124 may be determined within various ranges, depending on the design of a product to which the reciprocating motor 90 is applied.

The magnet 300 may be circumferentially disposed on at least one of the outer side of the inner stator 110 or the inner side of the outer stator 120. The magnet 300 may be spaced from the coil 200 in a reciprocation direction (or the axial direction) of the moving core 400. That is, the magnet 300 and the coil 200 may be disposed not to overlap each other in a radial direction of the stator 100.

In the related art, the magnet 300 and the coil 200 unavoidably overlap each other in the radial direction of the stator 100, so a diameter of the motor is unavoidably increased. However, in this embodiment, as the magnet 300 and the coil 200 are spaced from each other in the reciprocation direction of the moving core 400, the diameter of the reciprocating motor 90 may be reduced, as compared with the related art.

The magnet 300, for example, may be formed in a cylindrical shape. Alternatively, the magnet 300 may have an arc-shaped cross-section when seen in the axial direction. In this case, a plurality of magnets 300 may be arranged with a gap therebetween circumferentially around an outer side of the inner stator 110 or an inner side of the outer stator 120.

The magnet 300 may be disposed to be exposed to the air gap 130. A magnet seat 125 to fix the magnet 300 may be formed on any one of the surfaces facing each other of the inner stator 110 and the outer stator 120.

FIG. 3 shows an example in which the magnet 300 is disposed on the outer stator 120 and the magnet seat 125 is formed on the outer stator 120. The moving core 400 may be disposed in the air gap 130 to which the magnet 300 is exposed and is made of a magnetic material, for example, to reciprocate with respect to the stator 100 and the magnet 300.

The moving core 400 may be spaced from the coil 200 in the reciprocation direction of the moving core 400 and the gap between the coil 200 and the moving core 400 may be changed by reciprocation of the moving core 400. That is, the moving core 400 and the coil 200 may be disposed not to overlap each other in the radial direction of the stator 100. However, the moving core 400 may be disposed to overlap the magnet 300 in the radial direction of the stator 100.

In the related art, the moving core 400 and the coil 200 unavoidably overlap each other in the radial direction of the stator 100, so the diameter of the motor is unavoidably increased. However, in this embodiment, as the moving core 400 and the coil 200 are spaced from each other in the reciprocation direction of the moving core, the diameter of the motor may be reduced, as compared with the related art.

In this embodiment, the moving core 400 may be formed at least partially in an arc shape when seen in the axial direction. For example, the moving core 400 may be formed in a ring shape to be able to be inserted in the ring-shaped air gap 130, or a plurality of moving cores 400 having an arc-shaped cross-section may be circumferentially spaced from each other.

The moving core 400 may be supported by the bridge 402. A portion of the bridge 402 may be positioned in the air gap 130. Accordingly, at least a portion of the bridge 402 may be formed in a cylindrical shape. Further, the moving core 400 may be disposed to face the magnet 300 while being supported by the bridge 402.

For example, the moving core 400 may be disposed on an outer side of the bridge 402 to face the magnet 300 disposed on the inner side of the outer stator 120. The moving core 400 is inserted with a gap from the outer surface of the inner stator 110 or the outer stator 120 and the magnet 300 which are exposed to the air gap 130. A thickness of the moving core 400 may be smaller than a size of the air gap 130.

A first surface of the mover may be disposed to face the magnet 300 and a second surface (opposite to the first surface) of the mover may be disposed to face the inner stator 110. For example, the first surface of the mover may be an outer side of the magnet 300 and the second surface of the mover may be an inner side of the bridge 402.

The first surface of the mover and the magnet 300 may be spaced by a first gap G1 from each other, and the second surface of the mover and the inner stator 110 are spaced by a second gap G2 from each other. In this embodiment, the first gap G1 may be smaller than the second gap G2 to increase a motor spring stiffness. An effect of a difference between the first gap G1 and the second gap G2 will be described hereinafter with reference to the drawings.

In this embodiment, a length 2L1 of the magnet 300 may be two times or more of a maximum stroke of the moving cover 400. The reason for limiting the length 2L1 of the magnet 300 in this way is for considering inflection of the motor spring stiffness. Accordingly, it is required to make the length 2L1 of the magnet 300 larger than the maximum stroke of the moving core 400.

For example, if the maximum stroke of the moving core 400 is 11 mm, the length 2L1 of the magnet 300 should be designed to be larger by about 1 mm than the maximum stroke in consideration of inflection of the motor spring stiffness. Accordingly, for example, an axial length of the magnet 300 may be designed to be 24 mm.

Further, in this embodiment, an axial length L1 of the moving core 400 may be half a length of the magnet 300. In this case, the motor spring stiffness may be secured. Furthermore, in this embodiment, a thickness of the moving core 400 may be ¼ or less of the axial length of the moving core 400.

The magnet 300 may be formed such that different magnetic poles are arranged in the reciprocation direction of the moving core 400. For example, the magnet 300 may have a first pole 302 and a second pole 304, and the first pole 302 and the second pole 304 are arranged axially in a line.

Further, the first pole 302 may be disposed closer to the coil 200 or the compression space 31 than the second pole 304. It is exemplified in the following description that the first pole 302 is the N-pole and the second pole 304 is the S-pole, but the opposite case is also possible.

The first pole 302 may be formed longer than the second pole 304. The moving core 400 may be larger in axial length than the second pole 304.

In this embodiment, the moving core 400 is reciprocated by a reciprocation-directional centering force generated among the stator 100 having the coil 200, the magnet 300, and the moving core 400. The reciprocation-directional centering force means a force that is kept toward a position where magnetic energy (magnetic potential energy, magnetic resistance) is low when the moving core 400 is moved in a magnetic field, and the force acts to a magnetic resonance spring.

Accordingly, when the moving core 400 is reciprocated by the magnetic force generated by the coil 200 and the magnet 300, it accumulates a force intended to return to a center by the magnetic resonance spring. Further, the moving core 400 keeps reciprocating while resonating by the force accumulated in the magnetic resonance spring.

When the first pole 302 is formed longer than the second pole 304, as in this embodiment, a center C of the moving core 400 is not positioned on a boundary line between the first pole 302 and the second pole 304. Rather, the center C of the moving core 400 is positioned closer to the coil 200 (or the compression space 31) than the boundary line between the first pole 302 and the second pole 304.

Further, the center C of the moving core 400 is positioned closer to the coil 200 (or the compression space 31) than a line A1 equally dividing the axial length of the magnet 300 into two parts. The reason is because the first pole 302 is longer than the second pole 304, so it has a larger intensity of magnetic force.

An effect of the length difference between the first pole 302 and the second pole 304 will be described hereinafter with reference to the drawings.

An operational principle of the moving core type reciprocating motor according to the embodiment described above is described hereafter.

Figure 5:
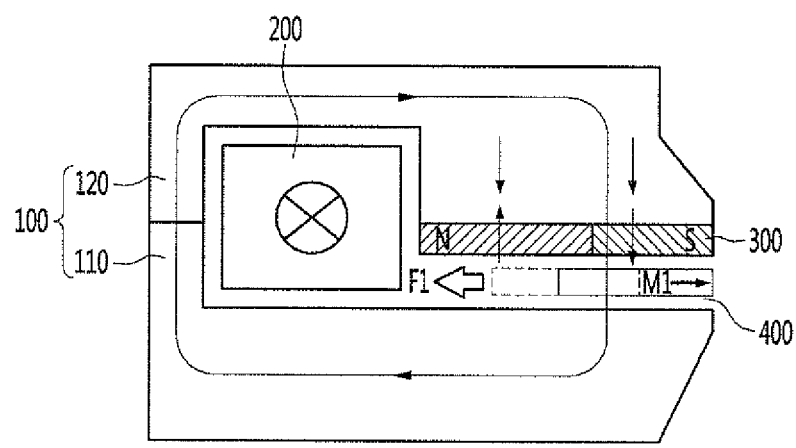
FIGS. 5 and 6 are schematic views illustrating operation of the moving core type reciprocating motor according to an embodiment.
Figure 6:
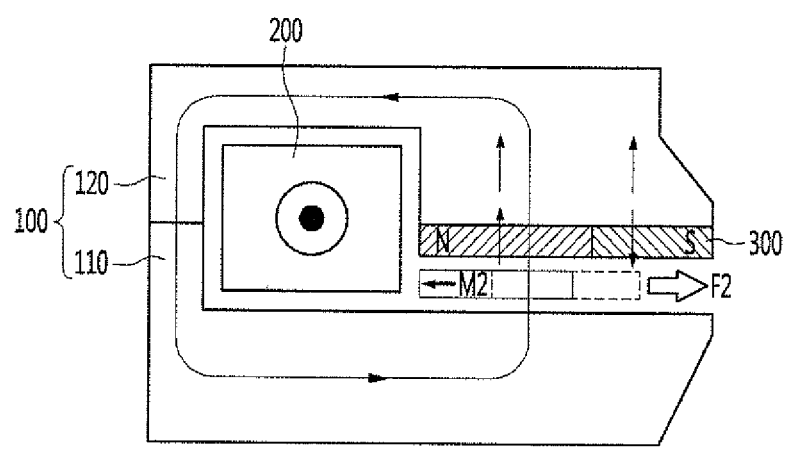

FIGS. 5 and 6 are schematic views illustrating operation of the moving core type reciprocating motor according to an embodiment. Referring to FIGS. 3, 5, and 6, when alternating current is applied to the coil 200 of the reciprocating motor 90, alternating magnetic flux is generated between the inner stator 110 and the outer stator 120. In this case, the moving core 400 continuously reciprocates while moving in both directions in the magnetic flux direction.

In this process, a magnetic resonance spring is generated among the moving core 400, the stator 200, and the magnet 300 in the reciprocating motor 90, so resonance of the moving core 400 is induced. For example, as shown in FIG. 5, alternating current can be applied to the coil 200 with the magnet 300 fixed to the outer stator 120 and magnetic flux by the magnet 300 flowing clockwise in the figure. Then, the magnetic flux by the coil 200 flows clockwise in the figure and the moving core 400 is moved to the right (see the arrow M1) in the figure in the direction in which the magnetic flux by the coil 200 and the magnetic flux of the magnet 300 are increased (see the arrow M1).

In this process, a reciprocation centering force F1 intended to return to the left in the figure where the magnetic energy (that is, magnetic potential energy or magnetic resistance) is low is accumulated among the moving core 400, the stator 100, and the magnet 300. In this state, when the direction of the current applied to the coil 200 is changed, the magnetic flux by the coil 200 flows counterclockwise in the figure. Then, the magnetic flux by the coil 200 and the magnetic flux of the magnet 300 are increased opposite to the previous direction, that is, to the left in the figure.

Accordingly, the moving core 400 is moved to the left in the figure (see the arrow M2) by the accumulated reciprocation centering force F1 and the magnetic force by the magnetic flux by the coil 200 and the magnet 300. In this process, the moving core 400 is further moved to the left in the figure across the line A1 equally dividing the length of the magnet 300 into two parts by inertia force and magnetic force.

Similarly, in this case, a reciprocation centering force F2 intended to return to the right in the figure where the magnetic energy is low is accumulated among the moving core 400, the stator 100, and the magnet 300. Further, as shown in FIG. 5, when the direction of the current applied to the coil 200 is changed, the moving core 400 is moved to the right by the accumulated reciprocation centering force F2 and the magnetic force by the magnetic flux by the coil 200 and the magnet 300.

In this case, similarly, the moving core 400 is further moved to the right in the figure across the line A1 equally dividing the length of the magnet 300 into two parts by inertia force and magnetic force. Further, reciprocation centering force F1 intended to return to the left in the figure where the magnetic energy is low is accumulated among the moving core 400, the stator 100, and the magnet 300.

The moving core 400 keeps repeatedly reciprocating alternately to the right and left in the figure in this way as if it is equipped with a mechanical resonant spring.

Figure 7:
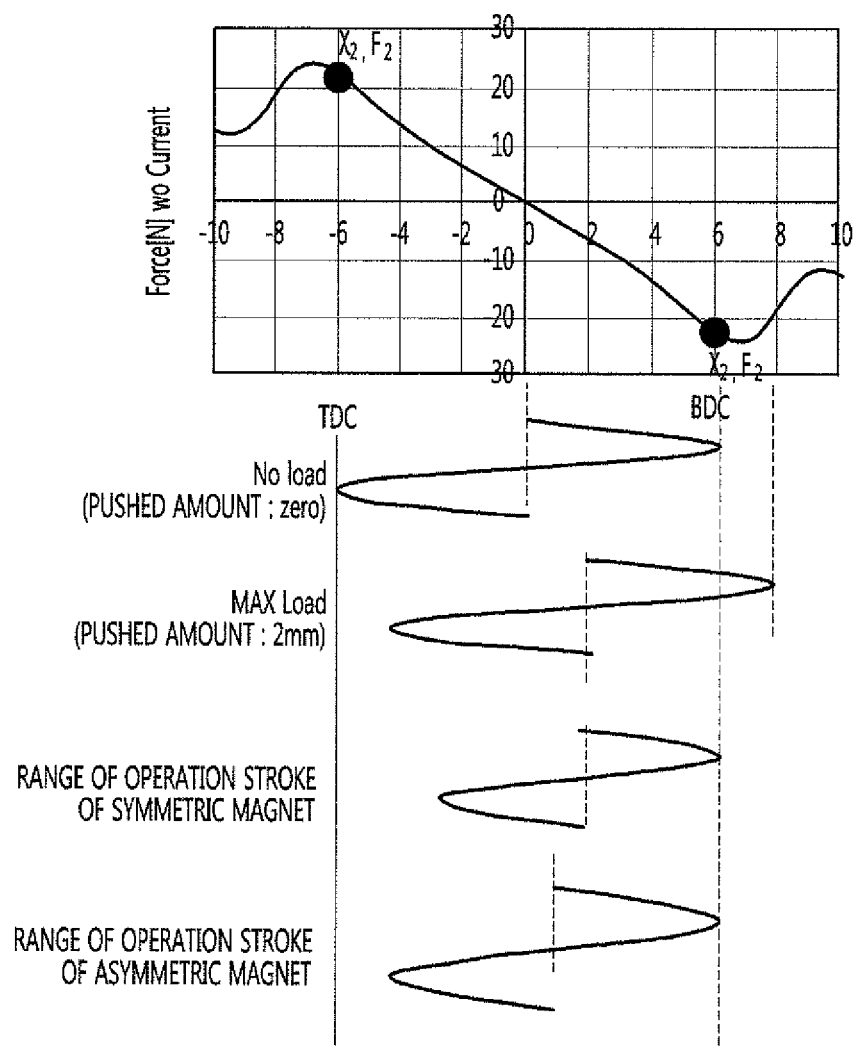
FIG. 7 is a view showing a stroke range of a moving core in a coolant compression process.
Figure 8:
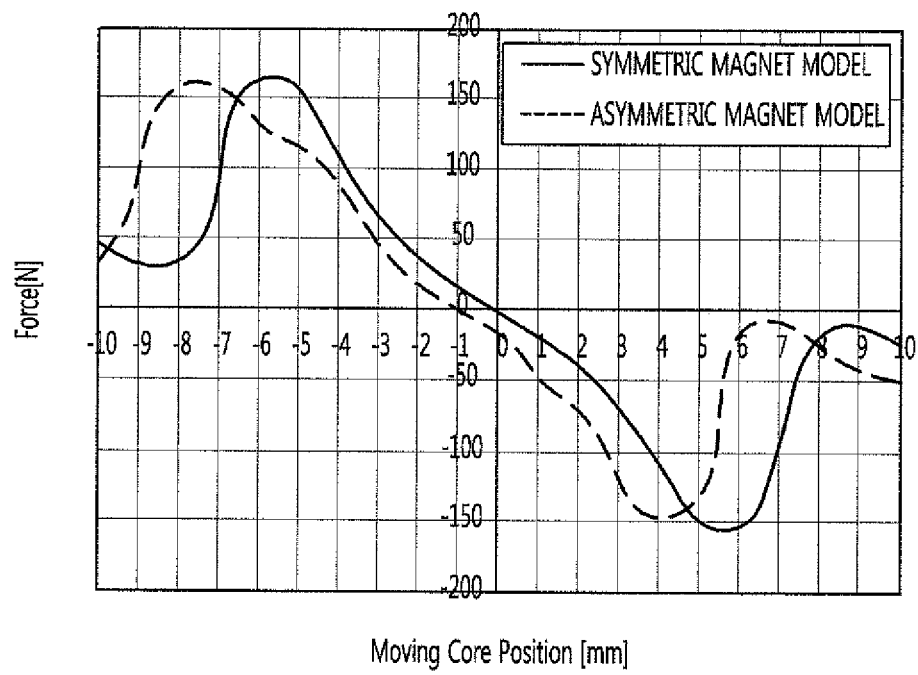
FIG. 8 is a view showing operation strokes of a symmetric magnet and an asymmetric magnet.

FIG. 7 is a view showing a stroke range of the moving core in a coolant compression process. FIG. 8 is a view showing operation strokes of a symmetric magnet and an asymmetric magnet.

Referring to FIGS. 7 and 8, the moving core 400 is reciprocated between a top dead center TDC and a bottom dead center BDC by the alternating current applied to the coil 200. In this embodiment, a distance between the top dead center TDC and the bottom dead center BDC may be referred to as an operation stroke. Theoretically, a point bisecting a line between the top dead center TDC and the bottom dead center BDC is the center of the moving core 400.

A coolant may be suctioned into the compression space 31 while the moving core 400 is moved from the center to the bottom dead center BDC. While the moving core 400 is moved from the bottom dead center BDC to the top dead center TDC, the piston 40 compresses the coolant in the compression space 31.

A length of the first stroke from the center to the bottom dead center BDC and a length of the second stroke from the center to the top dead center TDC are the same. However, actually, pressure is applied to the piston 40 while the piston 40 compresses the coolant in the compression space 31, so the piston 40 is pushed away from the discharge valve 32. That is, the piston 40 is pushed a predetermined distance toward the bottom dead center BDC.

In this case, the center of the moving core 400 is moved toward the bottom dead center BDC. Further, the moving core 400 is controlled not to move beyond the bottom dead center BDC.

Accordingly, when the magnet 300 is designed to have a symmetric shape such that the first pole and the second pole are the same in length, the length of the first stroke from the center of the moving core 400 to the bottom dead center BDC is reduced. Further, as the length of the second stroke from the center of the moving core 400 to the top dead center TDC is controlled to be the same as the length of the first stoke, the operation stroke of the moving core 400 is actually reduced in the process of compressing the coolant.

However, when the first pole 302 disposed closer to the compression space 31 is formed longer than the second pole 304, as in this embodiment, the distance that the center of the moving core 400 moves toward the bottom dead center BDC by the increased magnetic force of the first pole 302 may be minimized. Accordingly, the operation stroke of the moving core 400 may be increased, so the compression efficiency may be improved.

Further, according to this embodiment, it is possible to prevent an available frequency from being limited within a predetermined period of operation frequency by resonating the mover with a magnetic resonant spring, so the efficiency of the motor may be improved. That is, all frequencies may be used within an operation frequency.

Further, as the magnet is disposed on the stator, a weight of the mover may be decreased, so power consumption may be reduced and high-speed operation is possible.

Figure 9:
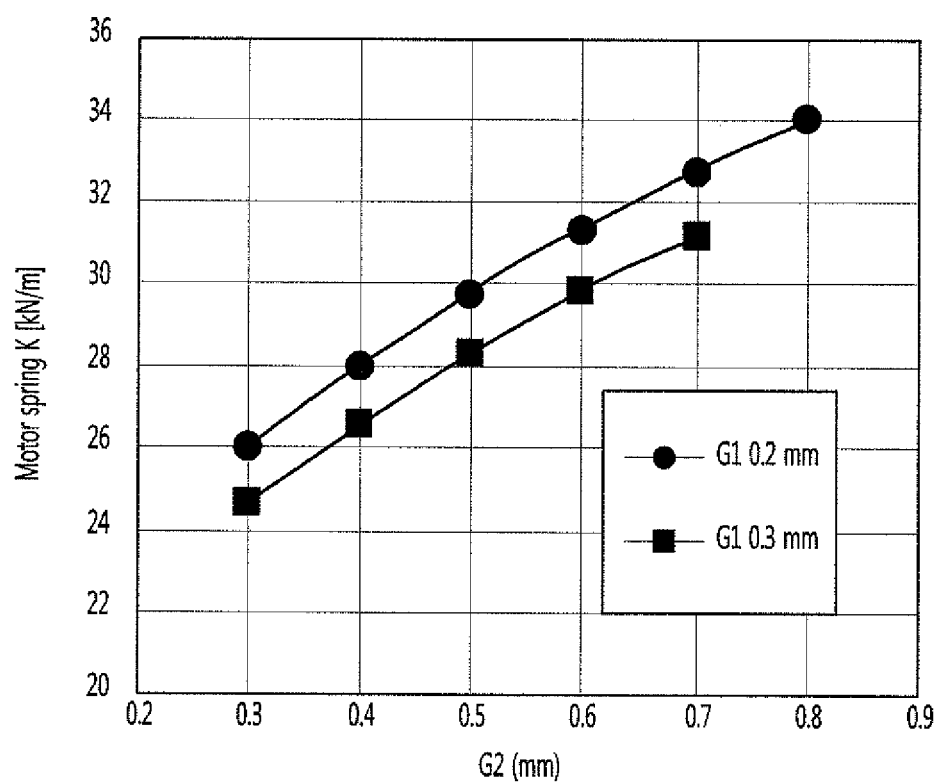
FIG. 9 is a graph showing motor spring stiffness according to a length of an air gap between the mover and the stator.
Figure 10:
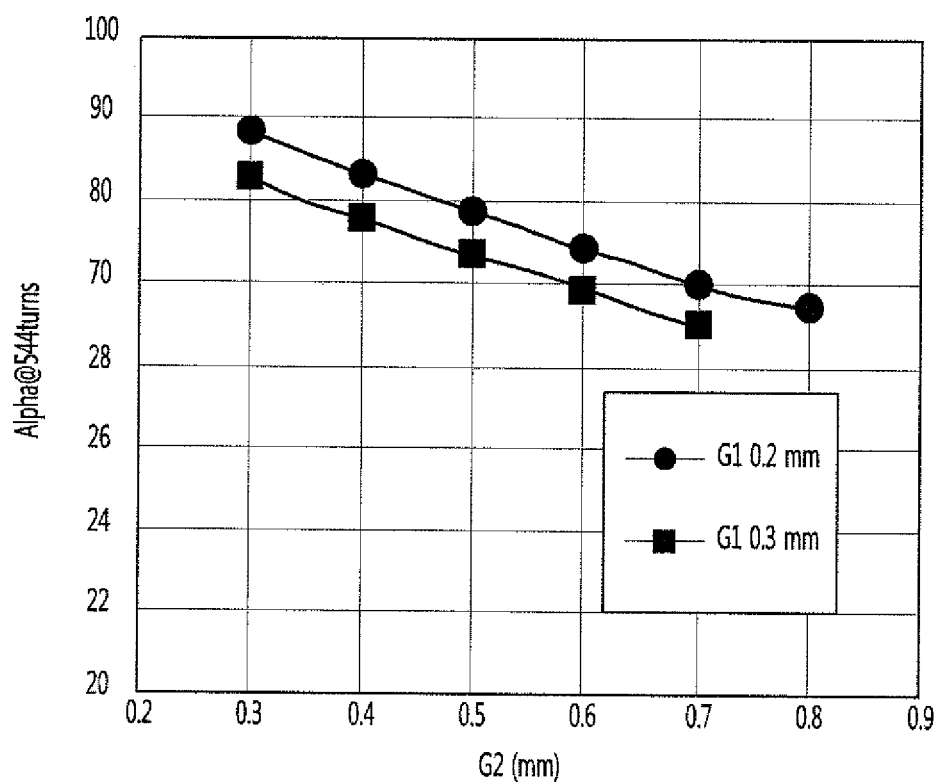
FIG. 10 is a graph showing a motor alpha value according to the length of the air gap between the mover and the stator.

FIG. 9 is a graph showing motor spring stiffness according to a length of an air gap between the mover and the stator. FIG. 10 is a graph showing a motor alpha value according to the length of the air gap between the mover and the stator.

First, referring to FIGS. 4 and 9, the larger the motor spring stiffness, the more stably the mover can resonate, and high-speed operation is possible. In FIG. 9, the larger the second gap G2 between the second surface of the mover and the inner stator 110, the larger the motor spring stiffness. Further, the smaller the first gap G1 between the first surface of the mover and the magnet 300, the larger the motor spring stiffness. Accordingly, in this embodiment, when the first gap G1 is smaller than the second gap G2, the effect that the motor spring stiffness is increased may be obtained.

Next, referring to FIG. 10, the smaller a sum of the first gap G1 and the second gap G2, the larger the motor alpha value (thrust constant). When the motor alpha value is increased, the force for moving the moving core 400 is increased, thereby increasing motor efficiency. In this embodiment, the sum of the lengths of the first gap G1 and the second gap G2 may be designed within 1 mm in order to satisfy both increasing the motor spring stiffness and increasing the motor alpha value.

Figure 11:
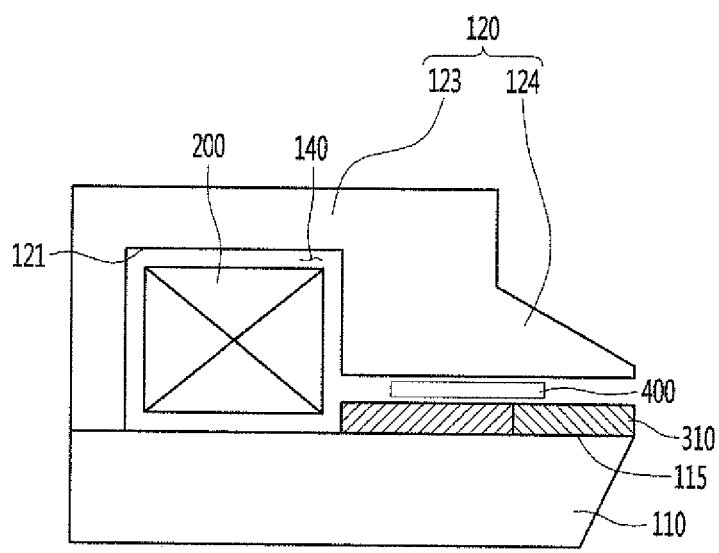
FIG. 11 is a cross-sectional view schematically showing a moving core type reciprocating motor according to another embodiment.

FIG. 11 is a cross-sectional view schematically showing a moving core type reciprocating motor according to another embodiment. Referring to FIG. 11, in the reciprocating motor of this embodiment, magnet 310 is the same in fundamental configuration as magnet 300 of the previous embodiment, but is characterized only by being fixed to the inner stator 110. A magnet seat 115 may be formed on the inner stator 110.

Accordingly, in this embodiment, the stator 100 where the magnets 300 and 301 are disposed may be referred to as a first stator and the stator where the magnets 300 and 301 are not disposed may be referred to as a second stator. Further, the first stator may be, as described above, an outer stator or an inner stator. In this embodiment, the same as the previous embodiment, the first gap G1 may be designed smaller than the second gap G2.

Figure 12:
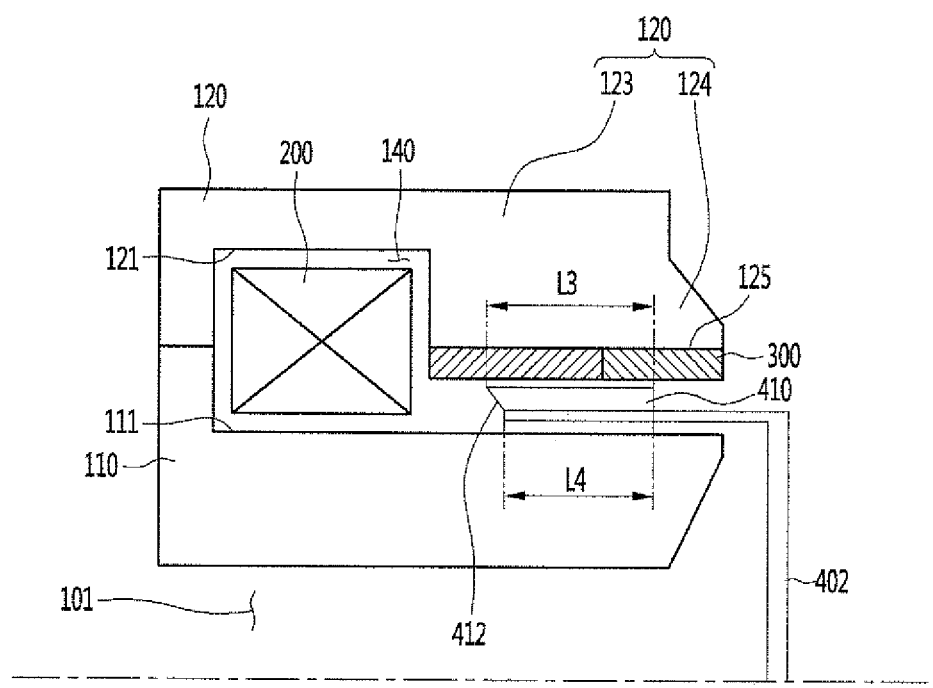
FIG. 12 is a cross-sectional view schematically showing a moving core type reciprocating motor according to another embodiment.
Figure 13:
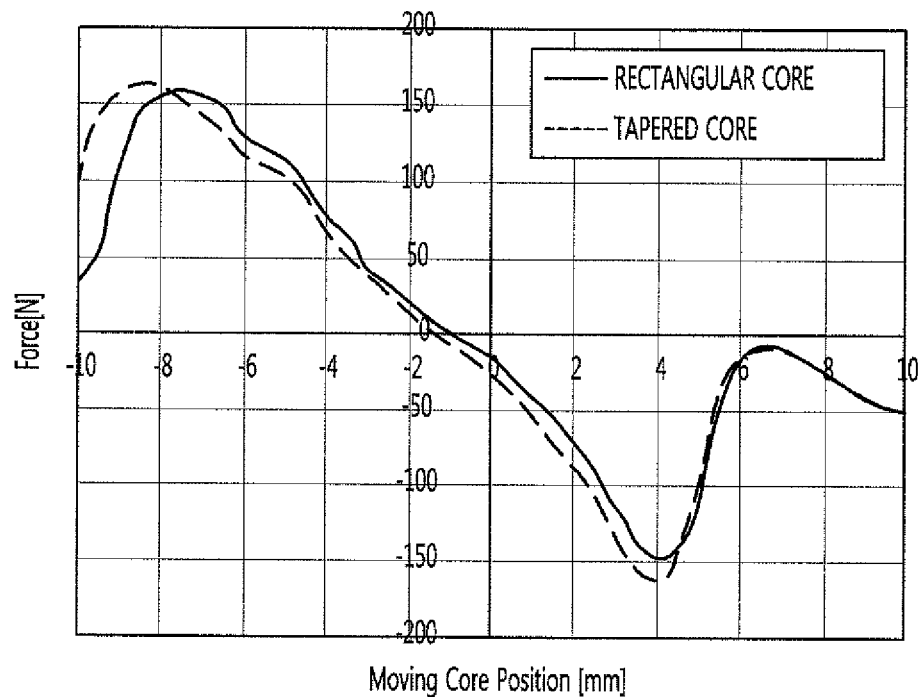
FIG. 13 is a view showing an operation stroke depending on a shape of a moving core.

FIG. 12 is a cross-sectional view schematically showing a moving core type reciprocating motor according to another embodiment. FIG. 13 is a view showing an operation stroke depending on a shape of a moving core.

Referring to FIGS. 12 and 13, a tapered portion 412 may be formed on a side of the moving core 410 of this embodiment. The tapered portion 412, for example, may be formed at a portion, which is close to the coil 200, of the moving core 410.

In the moving core 410, a length L3 of a first surface facing the magnet 300 may be larger than a length L4 of a second surface opposite to the first surface. In this embodiment, in the moving core 410, the length L3 of the first surface facing the magnet 300 may be larger than the length of the moving core 410 shown in FIG. 4.

In this case, a weight of the moving core 410 may be maintained at a same level and a length of the moving core 410 may be increased. Accordingly, it is possible to obtain an effect that a length of the operation stroke of the moving core 410 is increased, as compared with a moving core having a rectangular cross-section.

Figure 14:
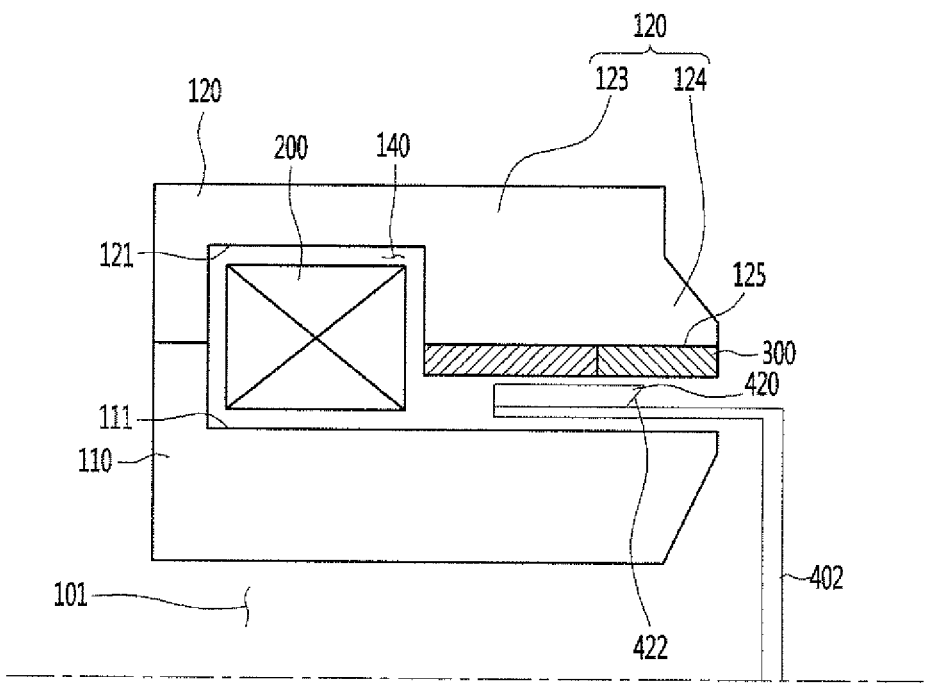
FIGS. 14 and 15 are cross-sectional views schematically showing a moving core type reciprocating motor according to another embodiment.
Figure 15:
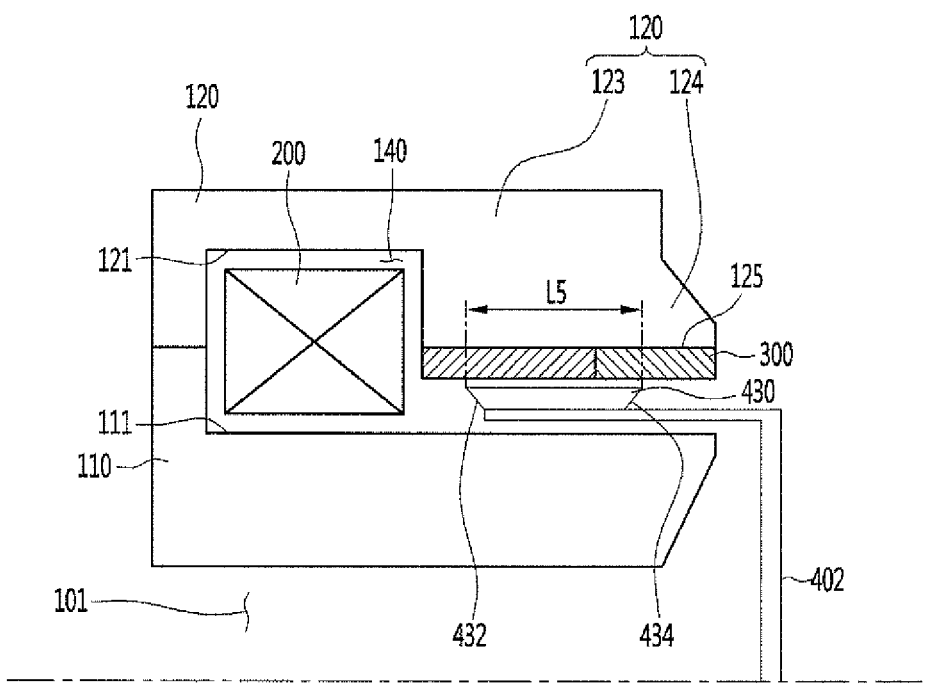

FIGS. 14 and 15 are cross-sectional views schematically showing a moving core type reciprocating motor according to another embodiment. Referring to FIG. 14, a tapered portion 422 may be formed at an edge farthest from the coil 200, in moving core 420.

In this case, similarly, in the moving core 420, a length of a first surface facing the magnet 300 may be larger than a length of a second surface opposite to the first surface.

By this embodiment, similarly, a weight of the moving core 420 may be maintained at a same level and a length of the moving core 420 may be increased. Accordingly, it is possible to obtain an effect that a length of an operation stroke of the moving core 420 may be increased, as compared with a moving core having a rectangular cross-section.

Referring to FIG. 15, tapered portions 432 and 434 may be formed respectively at both sides of moving core 430. In this case, a length L5 of the moving core 430 is larger than a length L3 of the first surface of the moving core 410 shown in FIG. 12, so an effect that a length of an operation stroke is further increased may be obtained.

Embodiments disclosed herein provide a moving core type reciprocating motor and a compressor capable of using all resonance frequencies within an operation frequency. Embodiments disclosed herein also provide a moving core type reciprocating motor and a compressor in which an operation stroke of a mover is increased.

Embodiments disclosed herein further provide a moving core type reciprocating motor in which a stiffness of a magnetic spring is increased, and a compressor having the moving core type reciprocating motor. Embodiments disclosed herein also provide a reciprocating motor and a compressor in which a weight of a mover is reduced, whereby high-speed operation is possible.

Embodiments disclosed herein provide a motor that may include a stator on which a coil may be wound and that has an air gap; a magnet that is fixed to the stator; and a mover that includes a moving core disposed to face the magnet in the air gap and reciprocating with respect to the stator, in which the magnet has a first pole and a second pole that are different poles arranged in a reciprocation direction of the mover, and a length of the first pole is larger than a length of the second pole.

Embodiments disclosed herein further provide a compressor that may include a case that has an internal space; a reciprocating motor that is disposed in the internal space of the case and includes a mover that reciprocates; a piston connected to the mover of the reciprocating motor to reciprocate together; and a cylinder in which the piston is inserted, thereby forming a compression space. The reciprocating motor may include a stator that has an air gap; a coil that is wound on the stator; a magnet that is fixed to the stator in the air gap; and a mover that includes a moving core disposed to face the magnet in the air gap and reciprocates with respect to the stator, and in which the magnet has a first pole and a second pole that are different poles arranged in a reciprocation direction of the mover, the first pole is disposed close to the compression space that the second pole, and a length of the first pole is larger than a length of the second pole.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A moving core type reciprocating motor, comprising:
   a stator on which a coil is wound and having an air gap;
   a magnet fixed to the stator; and
   a mover that includes a moving core disposed to face the magnet in the air gap and reciprocates with respect to the stator, wherein the magnet includes a first pole and a second pole that are different poles arranged in a reciprocation direction of the mover, wherein a length of the first pole is larger than a length of the second pole, wherein the stator includes an inner stator, and an outer stator having a first side connected to a first side of the inner stator and a second side disposed radially outside the inner stator to form the air gap together with a second side of the inner stator, wherein the coil is wound between the inner stator and the outer stator, wherein the first pole is disposed closer to the coil than the second pole, wherein the moving core and the magnet are spaced from the coil in the reciprocation direction of the mover, wherein the moving core is disposed to overlap the magnet when viewed in a radial direction of the stator, and wherein the coil and the moving core are disposed not to overlap each other when viewed in the radial direction of the stator.

2. The moving core type reciprocating motor of claim 1, wherein a first surface of the mover is spaced by a first gap from the magnet, wherein a second surface opposite to the first surface of the mover is spaced by a second gap from a surface, which forms the air gap of the stator, and wherein the second gap is larger than the first gap.

3. The moving core type reciprocating motor of claim 2, wherein the first surface of the mover is a surface of the moving core.

4. The moving core type reciprocating motor of claim 1, wherein the moving core includes a first surface facing the magnet and a second surface opposite to the first surface, and wherein a tapered portion is formed at one side or both sides of the moving core such that the first surface is longer than the second surface.

5. The moving core type reciprocating motor of claim 1, wherein a length of the moving core in the reciprocation direction of the mover is one half or more of a length of the magnet.

6. The moving core type reciprocating motor of claim 5, wherein the length of the moving core is larger than the length of the second pole.

7. A compressor including the moving core type reciprocating motor of claim 1.

8. A compressor, comprising:
   a case having an internal space;
   a reciprocating motor disposed in the internal space of the case and including a mover that reciprocates;
   a piston connected to the mover of the reciprocating motor to reciprocate together therewith;
   a cylinder in which the piston is inserted, thereby forming a compression space, wherein the reciprocating motor includes:
   a stator having an air gap;
   a coil wound on the stator;
   a magnet fixed to the stator in the air gap; and
   a mover that includes a moving core disposed to face the magnet in the air gap and reciprocates with respect to the stator, wherein the magnet includes a first pole and a second pole that are different poles arranged in a reciprocation direction of the mover, wherein the stator includes an inner stator, and an outer stator having a first side connected to a first side of the inner stator and a second side disposed radially outside the inner stator to form the air gap together with a second side of the inner stator, wherein the first pole is disposed closer to the compression space than the second pole, wherein a length of the first pole is larger than a length of the second pole, wherein the moving core and the magnet are spaced from the coil in the reciprocation direction of the mover, wherein the moving core is disposed to overlap the magnet when viewed in a radial direction of the stator, and wherein the coil and the moving core are disposed not to overlap each other when viewed in the radial direction of the stator.

9. The compressor of claim 8, wherein a first surface of the mover is spaced by a first gap from the magnet, wherein a second surface opposite to the first surface of the mover is spaced by a second gap from a surface of any one of the inner stator or the outer stator, and wherein the second gap is larger than the first gap.

10. The compressor of claim 8, wherein the moving core includes a first surface facing the magnet and a second surface opposite to the first surface, and wherein a tapered portion is formed at one side or both sides of the moving core such that the first surface is longer than the second surface.

11. A moving core type reciprocating motor, comprising:
a stator on which a coil is wound and having an air gap;
a magnet fixed to the stator; and
a mover that includes a moving core disposed to face the magnet in the air gap and reciprocates with respect to the stator, wherein the magnet includes a first pole and a second pole having different poles, wherein a length of the first pole is larger than a length of the second pole, wherein the stator includes an inner stator, and an outer stator having a first side connected to a first side of the inner stator and a second side disposed radially outside the inner stator to form the air gap together with a second side of the inner stator, wherein the first pole is disposed closer to the coil than the second pole, wherein a length of the moving core in a reciprocation direction of the mover is one half or more of a length of the magnet, wherein the moving core and the magnet are spaced from the coil in the reciprocation direction of the mover, wherein the moving core is disposed to overlap the magnet when viewed in a radial direction of the stator, and wherein the coil and the moving core are disposed not to overlap each other when viewed in the radial direction of the stator.

12. The moving core type reciprocating motor of claim 11, wherein the length of the moving core is larger than the length of the second pole.

13. The moving core type reciprocating motor of claim 11, wherein a first surface of the mover is spaced by a first gap from the magnet, wherein a second surface opposite to the first surface of the mover is spaced by a second gap from a surface, which forms the air gap of the stator, wherein the second gap is larger than the first gap, and wherein the first surface of the mover is a surface of the moving core.

14. The moving core type reciprocating motor of claim 11, wherein the moving core includes a first surface facing the magnet and a second surface opposite to the first surface, and wherein a tapered portion is formed at one side or both sides of the moving core such that the first surface is longer than the second surface.

15. A compressor including the moving core type reciprocating motor of claim 11.

16. A moving core type reciprocating motor, comprising:
a stator on which a coil is wound and having an air gap;
a magnet fixed to the stator; and
a mover that includes a moving core disposed to face the magnet in the air gap and reciprocates with respect to the stator, wherein the magnet includes a first pole and a second pole that are different poles arranged in a reciprocation direction of the mover, wherein a length of the first pole is larger than a length of the second pole, wherein a first surface of the mover is spaced by a first gap from the magnet, wherein a second surface opposite to the first surface of the mover is spaced by a second gap from a surface, which forms the air gap of the stator, and wherein the second gap is larger than the first gap.

17. The moving core type reciprocating motor of claim 16, wherein the first surface of the mover is a surface of the moving core.

* * * * *